(12) United States Patent
Drouillard et al.

(10) Patent No.: US 6,506,423 B2
(45) Date of Patent: Jan. 14, 2003

(54) METHOD OF MANUFACTURING A RUMINANT FEEDSTUFF WITH REDUCED RUMINAL PROTEIN DEGRADABILITY

(75) Inventors: James S. Drouillard, Olsburg, KS (US); Conrad M. Coetzer, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 18 days.

(21) Appl. No.: 09/746,413

(22) Filed: Dec. 21, 2000

(65) Prior Publication Data

US 2002/0122846 A1 Sep. 5, 2002

(51) Int. Cl.$^7$ .................................................. A23K 1/18
(52) U.S. Cl. ................................ 426/2; 426/44; 426/53; 426/634; 426/635; 426/807
(58) Field of Search .............................. 426/2, 44, 53, 426/634, 635, 807

(56) References Cited

U.S. PATENT DOCUMENTS

| | | | |
|---|---|---|---|
| 4,820,527 A | * 4/1989 | Christensen et al. | 426/2 |
| 4,885,170 A | 12/1989 | Hamill et al. | 424/117 |
| 4,957,748 A | 9/1990 | Winowiski | 426/2 |
| 5,023,091 A | 6/1991 | Winowiski | 426/2 |
| 5,064,665 A | 11/1991 | Klopfenstein et al. | 426/2 |
| 5,098,718 A | 3/1992 | Ardaillon et al. | 426/2 |
| 5,147,642 A | 9/1992 | Lotz et al. | 424/94.61 |
| 5,186,961 A | 2/1993 | Shih et al. | 426/2 |
| 5,354,818 A | 10/1994 | Vazza | 426/53 |
| 5,372,811 A | 12/1994 | Yoder | 424/94.6 |
| 5,429,828 A | 7/1995 | Fodge et al. | 426/18 |
| 5,565,225 A | 10/1996 | Johnston | 426/2 |
| 5,575,999 A | 11/1996 | Yoder | 424/94.6 |
| 5,662,901 A | 9/1997 | Tobey, Jr. et al. | 424/94.2 |
| 5,720,971 A | * 2/1998 | Beauchemin et al. | 424/438 |
| 5,789,001 A | 8/1998 | Klopfenstein et al. | 426/2 |
| 5,824,355 A | 10/1998 | Heitritter et al. | 426/459 |
| 5,866,526 A | 2/1999 | Olsen et al. | 510/392 |
| 5,891,708 A | 4/1999 | Saniez et al. | 435/243 |
| 5,902,615 A | 5/1999 | Saniez et al. | 426/51 |
| 5,948,454 A | 9/1999 | Virkki et al. | 426/53 |
| 6,221,380 B1 | * 4/2001 | Woodroof et al. | 424/438 |

OTHER PUBLICATIONS

Phillip Lobo, "Enzymes to Cut Animal Waste", Feed Management, vol. 51, No. 3, Mar. 2000.

G.J.P. Marsman et al, "The Effect of Thermal Processing and Enzyme Treatments of Soybean Meal on Growth performance, Ileal Nutrient Digestibilities, and Chyme Characteristics in Broiler Chicks", Poultry Science, No. 76, pp. 864–872, 1997.

Y.K. Park et al, "Fungal Invertase as an Aid for Fermentation of Cane Molasses into Ethanol", Applied and Environmental Microbiology, vol. 44, No. 4, pp. 988–989, Oct. 1982.

G.G. Irish et al, "Removal of the α–Galactosides of Sucrose from Soybean Meal Using Either Ethanol Extraction or Exogenous α–Galactosidase and Broiler Performance", Poultry Science, No. 74, pp. 1484–1494, 1995.

Bogdan A. Slominski, "Hydrolysis of Galactooligosaccharides by Commercial Preparations of α–Galactosidase and β–Fructofuranosidase: Potential for Use as Dietary Additives", J. Sci. Food Agric., No. 65, pp. 325–330, 1994.

G.J.P. Marsman et al, "In Vitro Accessibility of Untreated, Toasted, and Extruded Soybean Meals for Proteases and Carbohydrases", J. Agric. Food Chem., No. 45, pp. 4088–4095, 1997.

Jolanta Gdala et al, "The Digestbility of Carbohydrates, Protein and Fat in the Small and Large Intestine of Piglets Fed Non–Supplemented and Enzyme Supplemented Diets", Animal Feed Science Technology, No. 65, pp. 15–33, 1997.

Michele Vitolo et al, "Invertase Activity of Intact Cells of *Saccharomyces cerevisiae* Growing on Sugarcane Molasses. II. Unsteady–State Continuous–Culture Tests", Biotechnology and Bioengineering, vol. XXX, pp. 9–14, 1987.

J. Inborr et al, "Effect of Adding Fibre and Starch Degrading Enzymes to a Barley/Wheat Based Diet on Performance and Nutrient Digestibility in Different Segments of the Small Intestine of Early Weaned Pigs", Animal Feed Science and Technology, No. 44, pp. 113–127, 1993.

Pavel Hasal et al, "Continuous Sucrose Hydrolysis by an Immobilized Whole Yeast Cell Biocatalyst", Enzyme Microb. Technol., vol. 14, pp. 1007–1012, Dec. 1992.

M.M.H. Huisman et al, "Enzymatic Degradation of Cell Wall Polysaccharides from Soybean Meal", Carbohydrate Polymers, No. 38, pp. 299–307, 1999.

* cited by examiner

Primary Examiner—Chhaya D. Sayala
(74) Attorney, Agent, or Firm—Andrus, Sceales, Starke & Sawall, LLP

(57) ABSTRACT

A feedstuff with reduced ruminal protein degradability is prepared by mixing a carbohydrase enzyme with a material suitable for livestock feed and steeping the mixture under suitable conditions for the carbohydrase enzyme to hydrolyze carbohydrates contained within the material to reducing forms. The mixture is then heated to induce browning so that the protein contained within the material is rendered inert to ruminal degradation. The carbohydrase enzyme may be supplied to the steeping step by the addition of a microorganism capable of secreting the enzyme. A method of feeding a feedstuff with reduced ruminal degradability is also provided.

29 Claims, No Drawings

METHOD OF MANUFACTURING A RUMINANT FEEDSTUFF WITH REDUCED RUMINAL PROTEIN DEGRADABILITY

BACKGROUND OF THE INVENTION

This invention relates to livestock feed, and more particularly to a method of preparing a livestock feed and feeding of livestock to increase utilization of protein by ruminant animals.

Numerous methods are described in the prior art for treating feed for ruminant animals so that fed protein does not undergo degradation by microorganisms located in the rumen of the animal. Prior art methods include chemical treatments of feed as disclosed in U.S. Pat. No. 3,507,662 and U.S. Pat. No. 3,619,200. However, these methods are not widely accepted as they have been found to render a large portion of fed protein unavailable for digestion in the post-rumen tract. Also, the chemicals themselves are often undesirable for various reasons. For instance, U.S. Pat. No. 3,619,200 protects fed protein by chemical modification with formaldehyde but formaldehyde is not approved for use in feeds in the United States by the Food and Drug Administration due to toxicity concerns.

Heat treatments to protect fed protein from degradation by ruminal microorganisms are also described in the prior art. U.S. Pat. No. 3,695,891 is an early example of the use of heat treating. Heat treatment reduces degradability by reducing protein solubility and by blocking sites of enzyme attack through temperature-induced chemical reactions between components of the feed. However, heat treatments described in the early prior art did not recognize that heat treating to protect fed protein is a very sensitive reaction. It is now known that too little heat provides very little protection to the fed protein while too much heat renders the treated protein indigestible in the post-rumen track.

U.S. Pat. Nos. 4,957,748, 5,023,091 and 5,064,665 teach that the efficiency of utilizing protein in feed by ruminants may be increased by mixing a protein-containing feed and a reducing carbohydrate and subsequently heating at a temperature, pH and time to reduce degradability of the feed protein by rumen microorganisms. The resistance to degradability is due in large part to protected protein forms formed during a set of chemical reactions known as the early Maillard reactions. Early Maillard reactions are thoroughly discussed in U.S. Pat. Nos. 4,957,748, 5,023,091 and 5,064,655 and those discussions are specifically incorporated herein by reference. Briefly, the early Maillard reactions comprise a reversible condensation between the carbonyl group of a reducing sugar and the amino groups of a protein to form substituted sugar amines. The conversion of the free amino groups of fed proteins to a substituted form results in protein molecules resistant to microbial proteases present in the rumen. Once past the rumen, the condensation product between the reducing carbohydrate and the amino groups of the protein is free to undergo hydrolysis and the fed protein is therefore available for digestion in the post-rumen tract. The heating step necessary to induce early Maillard reactions is commonly termed "browning".

Addition of reducing carbohydrates to protein-containing feeds and subsequent browning has proven to be an effective means of increasing the proportion of undegraded intake protein (UIP) in ruminant animal feeds. Current commercial application of the technology commonly utilizes lignin sulfonate, a xylose-containing byproduct of the wood pulping industry, as a source of reducing carbohydrate to promote the early Maillard reaction. However, these reactions may be carried out with a large variety of commercially available reducing carbohydrates.

Although food science technology has advanced admirably in identifying methods to reduce ruminal protein degradability, the current technology is still deficient for several reasons. First, because present technology generally relies on the addition of reducing carbohydrates to protein-containing feed, this can impact on the dilution of protein, thus making the finished product less nutritionally efficient. Second, the addition of reducing carbohydrates to protein-containing feeds also makes the feed less conducive to shipment over long distances due to added bulk. Third, some existing treatment methods appear to significantly reduce the bioavailability of proteins in the post-rumen track resulting in a feed with lowered nutritional efficiency. Inferior availability of the amino acid lysine is often due to undesirable protein modifications. Fourth, reducing carbohydrates must be purchased, shipped and typically stored prior to their use in feed browning processes. The operational costs associated with purchasing and maintaining such supplies and associated handling equipment are relatively high. Thus, an improved method of manufacturing a protein-containing feed with reduced ruminal protein degradability that would alleviate the above-mentioned problems is desirable.

SUMMARY OF THE INVENTION

In one embodiment of the invention, a ruminant animal feed is manufactured by first mixing together a protein and carbohydrate-containing material suitable for livestock feed and a carbohydrase enzyme where the carbohydrase enzyme is effective in hydrolyzing carbohydrate molecules contained within the material. The mixture is then steeped at a temperature, pH and percent moisture for a time sufficient for the carbohydrase enzyme to effectively hydrolyze a portion of the carbohydrates contained within the material to their reducing forms. Following steeping, the mixture is heated at a temperature and time sufficient to: (1) significantly lower the degradability of proteins contained within the material to microorganisms in the rumen; and (2) maintain relatively high protein bioavailability in the post-rumen tract.

This method has the advantage over prior art methods in that it requires no additions of reducing carbohydrates from external sources. The enzymatic treatment allows conversion of a sufficient amount of carbohydrate molecules within the feedstuff itself to reducing forms to allow adequate protein protection in the subsequent heating, or browning, step. Thus, the feedstuff material, while having a protein content with reduced ruminal degradability, also has not been diluted by the addition of large amounts of reducing carbohydrates as required in some prior art methods. The cost of purchasing reducing carbohydrates and handling them is also eliminated by this method. In addition, the problem of shipping unnecessarily bulky feedstuffs is reduced.

As an alternative approach in the manufacturing method, the enzyme may be added to the steeping reaction in the form of a microorganism that secretes the particular carbohydrase enzyme or enzyme mixture. Suitable microorganisms may include fungi or bacteria. The microorganism may be in the form of a by-product from another industrial process such as brewer's yeast discarded from the brewing process.

In another aspect of the invention, there is provided a method of feeding animals a feedstuff with reduced ruminal protein degradability. This method includes the steps of selecting a protein-containing feed suitable for a ruminant animal, and feeding to the ruminant animal a product formed by mixing the protein and carbohydrate-containing feed and a carbohydrase enzyme so that, after steeping and browning, the product has a protein content substantially resistant to degradation by rumen microorganisms.

In yet another embodiment of the invention, a method of hydrolyzing carbohydrates in carbohydrate-containing material is provided. A carbohydrate-containing material suitable for livestock feed is mixed together with a carbohydrase enzyme so that the carbohydrase enzyme may hydrolyze the carbohydrates to reducing forms. The resulting material is useful in the subsequent preparation of ruminant animal feed.

Accordingly, it is an object of the invention to produce a novel method for preparing a feed which reduces the ruminal degradation of protein-containing feed in a manner superior to prior methods.

It is a further object of the invention to provide a novel method for preparing a feed which provides improved digestibility of undegraded intake protein in the post-rumen tract.

It is another object of the invention to provide a method of making a protein-containing feed resistant to ruminal microorganism degradation where the method of manufacture requires no substantial dilution of protein content.

It is a further object of the invention to provide a novel method for feeding livestock a feed with decreased ruminal protein degradability.

Various other features, objects and advantages of the invention will be made apparent from the following description.

DETAILED DESCRIPTION OF THE INVENTION

The method of making a ruminant animal feed according to this invention is initiated by selecting a protein and carbohydrate-containing material that is known to be suitable as an animal feed. The source of the protein and carbohydrate-containing material is not significant as long as it is a material suitable for livestock and such materials are well-known. Protein/carbohydrate sources may include oil seeds, grains, bean meal, sunflower seed meal, peas, canola meal, soybean meal, peanut meal, cottonseed meal, safflower meal, sesame meal, linseed meal, early bloom legumes, meat and bone meal, silages, corn gluten meal, by-product protein feedstuffs, milk products, poultry products, brewers grains, distillers grains, wheat middlings, soybean hulls, hays, corn, wheat, barley, sorghum, alfalfa, and mixtures thereof. The preferred protein and carbohydrate-containing material is soybean meal.

A carbohydrase enzyme is then selected and added to the protein and carbohydrate-containing material. As a general class, carbohydrase enzymes may be viewed as enzymes capable of breaking polysaccharides, oligosaccharides and disaccharides down into smaller carbohydrate units, many of the smaller units being reducing carbohydrate species. Representative carbohydrates include starches, dextrins, fibers, polysaccharides, sugars, pectins, amylose, amylopectin, cellulose, hemicellulose, xylans, pectic substances, arabinans, mannans, glucans, dextran, inulin, arabans, arabinoxylans, oligosaccharides, disaccharides, maltose, maltotriose, sucrose, lactose, raffinose, stachyose, gums and mixtures thereof.

A carbohydrase enzyme suitable for the invention may be from plant, animal, or other origin and include but is not limited to, invertase, α-galactosidase, α-amylase, amyloglucosidase, cellulases, hemicellulases, pentosanases, arabinofuranosidase, xylanase, amylases, glucoamylase, endoglucanase, pectic enzymes, pectin methylesterase, polygalacturonase, isomaltase, isoamylase, cyclomaltodextrinase, pullulanases, isopullulanase, hydrolases, glucosidases, dextranases, glucanases, galactosidases, mannanase, inulinase, and mixtures thereof. This list should not be considered inclusive of all carbohydrase enzymes suitable for use with this invention. Enzymes having vastly different catalytic mechanisms than those listed but with similar carbohydrate hydrolyzing abilities will also be suitable. The preferred carbohydrase enzyme is invertase.

Amounts of enzyme(s) needed for the hydrolysis of carbohydrates are dependent on the enzyme activity found in the specific enzyme source used. The number of units of a specific enzyme needed is a function of, among other factors, the amount and source of substrates, amount of reducing sugars desired, steeping time and temperature, water activity, pH, and combinations of enzymes used. For example, if steeping time is doubled, only around one-half the original number of enzyme units is needed to obtain similar results. The suggested range for invertase enzyme is about 8 Sumner units to about 800,000 Sumner units per 100 grams of soybean meal, dependent on aforementioned factors. One Sumner unit is the quantity of enzyme which will convert 1 mg of sucrose (in a 5.4% (w/v) sucrose solution at pH 4.5 and 20° C.) to glucose and fructose in five minutes.

As an alternative approach, carbohydrase enzymes may be supplied to the manufacturing process by a microorganism where the microorganism produces the desired enzyme. The microorganism(s) may be fungi, protozoa, algae, bacteria, or combinations thereof. The microorganism may further be supplied in the form of a commercial by-product such as brewer's yeast discarded from a brewery. Baker's yeast (*Saccharomyces cerevisiae*) may be added to a suitable feed at a level of 200,000 colony forming units (cfu) to 100 billion cfu per 100 g of soybean meal, depending on, among other factors, the amount and source of substrates (carbohydrates), amount of reducing sugars desired, steeping time and temperature, water activity, and pH. Suitable organisms include, but is not limited to, direct-fed microbials, fungi, protozoa, algae, bacteria, *Saccharomyces cerevisiae*, yeast cultures, active dry yeast, *Candida utilis, Kluyveromyces marxianus*, Torula yeast, brewers yeast, *Aspergillus niger, Aspergillus oryzae, Bacillus*species, *Bacteroides*species, *Lactobacillus*species, *Bifidobacteria*species, *Trichoderma viride, Leuconostoc mesenteroides, Pediococcus*species, *Propionibacteria*species, *Saccharomyces*species, *Streptococcus*species, or combinations thereof.

The incubation of the mixture at suitable temperature, pH, moisture content and time is carried out in a steeping step. The temperature for the steeping step may be from about 20° C. up to about 75° C. although the particular steep temperature will depend on the particular enzyme or enzyme mixture being used. The preferred steep temperature is from about 45° C. to about 65° C. for the enzyme invertase. The pH for steeping may be from 4 to about 10.5 with the preferred pH being from about 5 to about 7. The steep may be allowed to run from around 10 minutes up to about 12 hours with about 40 to 90 minutes being the preferred time. Optimal steeping time is dependent, among other factors, on the amount and source of substrates (carbohydrates), amount of reducing sugars desired, steeping temperature, water activity, pH, and enzyme concentration. The amount of moisture added to the mixture may be up to about 40% by weight with about 10% to about 20% being preferred when using the soybean meal and invertase combination.

Following steeping, the mixture is heated to a temperature ranging from about 80° C. to about 180° C. for about 30 minutes to 3 hours to effectively brown the material. The preferred temperature is about 90° C. to about 120° C. for 45 minutes to about 90 minutes. During browning, reducing carbohydrates formed by the action of the carbohydrate enzyme undergo condensation reactions with free amino groups of protein molecules to form protein species resistant to degradation by microorganisms located in the rumen. Thorough discussion of the browning reaction can be found in U.S. Pat. Nos. 4,957,748, 5,023,091 and 5,064,665, each of which is specifically incorporated herein by reference.

The efficacy of a feedstuff prepared by the foregoing method is illustrated by the following nonlimitive examples. These examples are directed at showing reduced protein degradability qualities as well as improved protein bioavailability aspects of a feedstuff made according to the present invention.

EXAMPLES

The soluble oligosaccharide content of the dry seeds of various plants is shown in Table 1. Solvent-extracted SBM contains 1.6% fructose, 5.4% sucrose, 0.8% raffinose, and 4.9% stachyose (Huisman et al., 1998). Sucrose and its α-D-galactosides (galactooligosaccharides), raffinose and stachyose, are non-reducing and can therefore not participate in non-enzymatic browning reactions. However, the use of exogenous hydrolytic enzymes can liberate reducing sugars from sucrose and galactooligosaccharides. Invertase (β-D-fructofuranoside fructohydrolase: EC 3.2.1.26) is capable of liberating fructose not only from sucrose but also from raffinose and stachyose resulting in the formation of melibiose and manninotriose, respectively. Alpha-galactosidase (α-D-galactoside galactohydrolase: EC 3.2.1.22) has the ability to hydrolyze the α-1-6 linkages of melibiose, raffinose, and stachyose (Slominski, 1994). Baker's yeast (*Saccharomyces cerevisiae*) is also capable of cleaving sucrose into glucose and fructose by means of its periplasmic invertase.

TABLE 1

Soluble oligosaccharides (% of defatted meal) in dry seeds of various plants

| Seed | Stachyose | Raffinose | Sucrose |
| --- | --- | --- | --- |
| Soybean | | | |
| Sosulski et al., 1982 | 2.85 | 1.15 | 6.35 |
| Kennedy et al., 1985[1] | 3.72 | 0.84 | 5.82 |
| Kuo et al., 1988[2] | 4.22 | 1.21 | 6.85 |
| Cotton[3] | 2.36 | 6.91 | 1.64 |
| Cow peas | | | |
| Sosulski et al., 1982 | 4.44 | 0.41 | 2.64 |
| Kuo et al., 1988 | 4.64 | 0.37 | 2.59 |
| Peanut[3] | 0.99 | 0.33 | 8.10 |
| Sunflower[3] | 0.14 | 3.09 | 6.50 |
| Safflower[3] | — | 0.52 | 1.86 |

[1]Average of four cultivars
[2]Average of two cultivars
[3]Kuo et al., 1988

Example 1

Preliminary studies were conducted to determine whether additions of various carbohydrase enzymes to oilseed meals were effective in inducing non-enzymatic browning. Visual appraisal was used initially to evaluate the extent of browning. Enzymes evaluated included invertase, α-galactosidase, α-amylase, and amyloglucosidase. Further research was pursued using invertase due to its relative low cost and ability to yield satisfactory browning. Dehulled, solvent extracted soybean meal (SBM) was used to manufacture the browned samples. All samples were prepared in duplicate. Invertase treated SBM (ESBM) was prepared by mixing 200 g SBM and 400 mg invertase enzyme (54,000 units/g, Grade V: Practical, from bakers yeast, Sigma Chemical Co, P.O. Box 14508 St. Louis, Mo., 63178, USA) dissolved in cold tap water (10 g) using a commercial food mixer at low speed for 60 seconds. One hundred grams of the enzyme/SBM-mixture were weighed into a 9×12×5 cm aluminum pan, covered with aluminum foil and allowed to steep for 60 minutes at room temperature (23° C.). Following steeping, the pans were placed into a preheated forced air oven set at 150° C. for 60 minutes. Following heating, the aluminum foil was removed, samples were cooled to room temperature, and air-dried for 72 hours. Half of each sample was ground to pass through a 2-mm screen. The same procedures were followed to prepare control samples except that no enzyme was added.

In vitro. Microbial degradation of treated SBM samples was measured by the in vitro ammonia release procedure as described by Britton et al. (1978) with some minor modifications. Untreated SBM and SOYPASS also were included in the in vitro run. SOYPASS is a trademarked product of Lignotech USA, Inc. and is a commercially available, protein protected, non-enzymatically browned SBM prepared by adding reducing carbohydrate from an external source to the SBM prior to browning. All SBM samples (ground) were added at 20 mg nitrogen to 50 ml plastic centrifuge tubes in duplicate. Whole ruminal contents were collected from two cannulated Holstein steers fed a diet consisting of 50% alfalfa hay, 40% dry rolled corn, 5% SBM, 4% molasses, and 1% vitamin/mineral mixture. Ruminal contents were strained through four layers of cheesecloth and subsequently placed in a pre-warmed insulated container. Equal volumes of ruminal fluid from each steer were mixed to make up the ruminal fluid portion of the inoculum. Equal volumes of ruminal fluid and McDougall's buffer (McDougall, 1948) were mixed and 30 ml of this inoculum were dispensed into centrifuge tubes containing samples. Tubes were flushed with $CO_2$, stoppered and incubated in a 39° C. room for 12 hours. Fermentation was terminated, by adding 2 ml of 6N HCL to each tube. Tubes were centrifuged at 30,000×g and the supernatant was frozen until analyzed. Ammoniacal N was determined by the indophenol method (Broderick and Kang, 1980). Data were analyzed as a randomized complete block design using the GLM procedure of SAS (SAS System for Windows, Release 6.11; SAS Inst. Inc., Cary, N.C.), with batch as the blocking factor.

In situ. The treated SBM samples (unground) also were subjected to a 14-h ruminal incubation in polyester bags (Ankom, 140 Turk Hill Park, Fairport, N.Y., 14450) to estimate ruminal protein degradability. A 1.25 g sample of each source was weighed in duplicate into 5×10 cm polyester bags (53×10 micron pores) and sealed with a heat sealer. The bags were placed into a weighted 36×42 cm polyester lingerie bag and pre-soaked in 39° C. tap water for 20 minutes before ruminal incubation using one of the same Holstein steers used for the in vitro trial. Two in situ incubations were done on consecutive days. Duplicate 0 hour bags were pre-soaked in 39° C. tap water for 20 minutes and later rinsed with the rest of the bags. Upon in 39° C. tap water for 20 minutes and later rinsed with the rest of the bags. Upon removal from the rumen, bags were washed in cold water, in a commercial top-loading washing machine, until the rinse water was clear. Bags were subjected to 10 consecutive rinse cycles, each consisting of a 1 minute agitation (delicate setting) and a 2 minute spin. After rinsing, bags were dried for 24 hours in a forced-air oven set at 105° C. Following drying, bags were weighed to determine residual dry matter (DM). Residual material was analyzed for Kjeldahl N (AOAC, 1984). Data were analyzed as a randomized complete block design using the GLM procedure of SAS, with incubation as the blocking factor.

Example 2

Extensive browning can be deleterious to overall protein quality as a result of decreased lysine availability. The objective of these trials was to compare the relative bioavailability of the invertase treated SBM to that of other non-enzymatically browned SBM sources using broiler chick growth assays. One hundred kilograms of SBM were weighed into a paddle feed mixer. Two hundred grams invertase enzyme (Grade V: Practical, from bakers yeast, Sigma Chemical Co.) were dissolved in 5 L of 55° C. tap water by stirring with a glass rod for 2 minutes. The enzyme solution was added to the SBM while mixing (3 minutes). Seven kilograms of the enzyme/SBM-mixture were weighed into 60×30×10 cm aluminum pans and covered with aluminum foil. The pans were placed into preheated forced air ovens set at 105° C. Thermocouples were inserted into the soybean meal core of one pan on each oven rack. Half of the pans were removed as soon as the core temperature reached 100° C. (ESBM1), whereas the remaining pans were removed 30 minutes later (ESBM2). Following heating, aluminum foil was removed, samples were cooled to room temperature, and air-dried for 72 hours.

Six hundred, day-old, Cobb×Cobb male broiler chicks were secured from a commercial source. One hundred and sixty of these were wing-banded and weighed individually on arrival. The remaining chicks were placed on a common corn/soy diet for 7 days. Ten randomly chosen, wing-banded chicks were subsequently placed into each of 16 thermoregulated starter batteries (Petersime Incubator Co., Gettysburg, Ohio 45328) with raised wire floors. Chicks had continuous access to feed and water throughout the 7 day study. Diets (Table 2) were formulated using one of four SBM sources: untreated SBM, SOYPASS, SOYPLUS or ESBM1. SOYPLUS has been previously described in Example 1. SOYPLUS is a trademarked, protein protected product (U.S. Pat. No. 5,225,230) of West Central, P.O. Box 68, Ralston, Iowa 51459 and is manufactured by a modified expeller process. The SBM sources were added to diets to provide an estimated 80% of daily lysine requirements (NRC, 1994). All diets were formulated to be iso-nitrogenous and first-limiting in lysine. Diets were randomly assigned to cages (four cages per diet). The final weight was obtained after a 12 hour feed withdrawal on day 7. Total weight gain per cage (mortalities included), feed consumption, and feed efficiency were determined for each cage.

TABLE 2

Composition of experimental diets used in the first broiler trial (Exp. 2)

| | SBM | ESBM1 | SOYPASS | SOYPLUS |
|---|---|---|---|---|
| | | | % DM | |
| Ground corn | 58.5 | 58.5 | 58.5 | 58.5 |
| Corn starch | 7.0 | 7.0 | 6.0 | 3.1 |
| SBM | 26.5 | — | — | — |
| ESBM1 | — | 26.5 | — | — |
| SOYPASS | — | — | 27.5 | — |
| SOYPLUS | — | — | — | 30.4 |
| Soybean oil | 4.0 | 4.0 | 4.0 | 4.0 |
| D/L Methionine | .25 | .25 | .25 | .25 |
| Calcium Phosphate | 1.1 | 1.1 | 1.1 | 1.1 |
| Limestone | 1.9 | 1.9 | 1.9 | 1.9 |
| Salt | .5 | .5 | .5 | .5 |
| Vitamin/mineral premix[1] | .25 | .25 | .25 | .25 |

[1]Contained 4% Mn, 4% Zn, 2% Fe, 0.45% Cu, 0.06% I, 0.006% Se, 3,080,000 IU vitamin A/kg, 660,000 ICU vitamin $D_3$/kg, 6,600 IU vitamin E/kg, 4.4 mg vitamin B12/kg, 330 mg menadione (vitamin K)/kg, 2,640 mg riboflavin/kg, 440 mg thiamine/kg, 2,640 mg pantothenic acid/kg, 11,000 mg niacin/kg, 550 mg vitamin B6/kg, 275 mg folic acid/kg, 154,000 mg choline/kg and 13.2 mg biotin/kg.
SBM = soybean meal.
ESBM1 = SBM was treated with invertase enzyme and heated in ovens set at 105° C. until the core temperature reached 100° C.

Three hundred and twenty of the chicks that were fed the common corn/soy diet were used in a second 7 day broiler trial. On day 7, eight randomly chosen chicks were weighed as a group and placed into each of 40 rearing cages in a thermoregulated house. Chicks had continuous access to feed and water throughout the 7 day study. Diets (Table 3) were formulated using one of five SBM sources: untreated SBM, SOYPASS, SOYPLUS, ESBM1 or ESBM2. The soybean meal sources were added to diets to provide an estimated 80% of daily lysine requirements (NRC, 1994). All diets were formulated to be iso-nitrogenous and first-limiting in lysine. Diets were randomly assigned to cages (eight cages per diet). The final weight was obtained after a 12 hour feed withdrawal on day 14. Total weight gain per cage (mortalities included), feed consumption, and feed efficiency were determined for each cage. Data were analyzed as a completely randomized design using the GLM procedure of SAS.

TABLE 3

Composition of experimental diets used in the second broiler trial (Exp. 2)

| | SBM | ESBM1 | ESBM2 | SOYPASS | SOYPLUS |
|---|---|---|---|---|---|
| | | | % DM | | |
| Ground corn | 58.5 | 58.5 | 58.5 | 58.5 | 58.5 |
| Corn starch | 7.0 | 7.0 | 7.0 | 6.0 | 3.1 |
| SBM | 26.5 | — | — | — | — |
| ESBM1 | — | 26.5 | — | — | — |
| ESBM2 | — | — | 26.5 | — | — |
| SOYPASS | — | — | — | 27.5 | — |
| SOYPLUS | — | — | — | — | 30.4 |
| Soybean oil | 4.0 | 4.0 | 4.0 | 4.0 | 4.0 |
| D/L Methionine | .25 | .25 | .25 | .25 | .25 |
| Calcium Phosphate | 1.1 | 1.1 | 1.1 | 1.1 | 1.1 |
| Limestone | 1.9 | 1.9 | 1.9 | 1.9 | 1.9 |
| Salt | .5 | .5 | .5 | .5 | .5 |

TABLE 3-continued

Composition of experimental diets used in the second broiler trial (Exp. 2)

|  | SBM | ESBM1 | ESBM2 | SOYPASS | SOYPLUS |
|---|---|---|---|---|---|
|  |  |  | % DM |  |  |
| Vitamin/mineral premix[1] | .25 | .25 | .25 | .25 | .25 |

[1]Contained 4% Mn, 4% Zn, 2% Fe, 0.45% Cu, 0.06% I, 0.006% Se, 3,080,000 IU vitamin A/kg, 660,000 ICU vitamin $D_3$/kg, 6,600 IU vitamin E/kg, 4.4 mg vitamin B12/kg, 330 mg menadione (vitamin K)/kg, 2,640 mg riboflavin/kg, 440 mg thiamine/kg, 2,640 mg pantothenic acid/kg, 11,000 mg niacin/kg, 550 mg vitamin B6/kg, 275 mg folic acid/kg, 154,000 mg choline/kg and 13.2 mg biotin/kg.
SBM = soybean meal.
ESBM1 = SBM was treated with invertase enzyme and heated in ovens set at 105° C. until the core temperature reached 100° C.
ESBM2 = Same as ESBM1 except that product was removed from ovens 30 min later.

In situ. The treated SBM samples used in the second broiler trial also were subjected to a 10 and 14 hour ruminal incubation in polyester bags to estimate ruminal protein degradability following the same procedures described in Example 1 except that each source was weighed in quadruplicate. Data were analyzed as a randomized complete block design using the GLM procedure of SAS, with incubation as blocking factor.

Example 3

The objective of this study was to establish the optimal level of invertase alone, or in combination with α-galactosidase, needed to optimize non-enzymatic browning of SBM. Five Invertase (80,000 SU/g, VALIDASE Invertase, Valley Research, Inc., P.O. Box 750 South Bend, Ind. 46624-0750) levels, 0, 0.0125, 0.025, 0.05 and 0.1% (w/w), and 3 α-galactosidase (25,000 ADSU/g, VALIDASE AGS 25 Concentrate, Valley Research, Inc.) to invertase ratios, 0:1, 0.5:1 and 1:1, were evaluated in this trial. Dehulled, solvent extracted SBM was used to manufacture the browned samples. All samples were prepared in duplicate. One hundred grams of SBM were weighed into a plastic mixing bowl (25 cm diameter). The appropriate amounts of invertase and α-galactosidase enzymes were dissolved in 55° C. water (10 g) by stirring with a glass rod for 2 minutes. The enzyme solution was added to the SBM while mixing with a commercial food mixer at low speed for 60 seconds. The enzyme/SBM-mixture was transferred to a 9×12×5 cm aluminum pan, covered with aluminum foil and allowed to steep for 60 minutes in a preheated convection oven set at 55° C. Following steeping, the pans were placed into a preheated forced air oven set at 150° C. for 60 minutes. The aluminum foil was removed after cooking, samples were cooled to room temperature, and air-dried for 72 hours. The treated SBM samples were subjected to a 14 hours in situ incubation following the same procedures described in Example 2. Data were analyzed as a randomized complete block design with a 5×3 factorial arrangement of treatments (5 invertase levels and 3 ∀-galactosidase:invertase ratios); incubation was the blocking factor. Linear and quadratic effects were tested using orthogonal contrasts when no interactions were detected.

Example 4

The objective of this experiment was to compare different enzyme and yeast treatments of SBM to the addition of various reducing sugars to SBM, as well as to various commercial non-enzymatically browned SBM sources. Enzymes evaluated, included 0.05% (w/w) invertase (VALIDASE Invertase, Valley Research, Inc.), and a combination of 0.05% (w/w) invertase and 0.05% (w/w) α-galactosidase (VALIDASE AGS 25 Concentrate, Valley Research, Inc.). Two baker's yeast (*Saccharomyces cerevisiae*) sources, WESTERN yeast (WESTERN Yeast Culture 2X-2-2-5 Plus, Western Yeast Company, 305 West Ash Street, Chillicothe, Ill., 61523-0257) and FLEISCHMANN'S yeast (Fleischmann's Yeast, Fenton, Mo., 63026), included at 0.5% (w/w) were evaluated. Reducing sugars evaluated included, 2% (w/w) glucose, fructose, or xylose or a combination of 1% (w/w) glucose and 1% (w/w) fructose. Commercial non-enzymatically browned SBM sources including extruded SBM, SOYPLUS and SOYPASS also were included in the comparison. The same procedures described in Example 2 were used to manufacture the browned samples except that the yeast treatments were steeped at 30 rather than 55° C. The same procedures described in Example 2 also were followed for 14 hour in situ incubations and for statistical analyses.

Example 5

The optimal temperature range for invertase and α-galactosidase lies between 55 and 60° C. However, the optimal temperature for yeast fermentation is around 30° C. The objective of this experiment was to evaluate the effects of different steeping temperatures on the ability of yeast cells to liberate reducing sugars from SBM carbohydrates. Three steeping temperatures, 23 (ambient), 30 and 55° C., were evaluated using two yeast sources, WESTERN yeast and FLEISCHMANN'S yeast, included at 0.5% (w/w). The same procedures described in Example 2 were followed for manufacturing the browned samples, for 14 hour in situ incubations, and for statistical analyses.

Example 6

The objective of this experiment was to evaluate whether the addition of different enzymes to various protein-rich feedstuffs are effective in hydrolyzing native carbohydrates to reducing sugars that are able to participate in non-enzymatic browning reactions. Enzymes evaluated included, combinations of 1) 0.1% (w/w) α-galactosidase and 0.1% (w/w) invertase, 2) 0.1% (w/w) α-amylase (EC 3.2.1.1, 40,000 SKBU/g, Sigma Type XII-A bacterial from *Bacillus licheniformis*, Sigma Chemical Co.) and 0.1% (w/w) glucoamylase (300–330 AG/ml, VALIDASE GA, Valley Research, Inc.), and 3) 0.1% (w/w) hemicellulase (400,000 HUC/g, VALIDASE DP 374 Hemicellulase), 0.1% (w/w) cellulase (4,000 CU/g, Cellulase 4000, Valley Research, Inc.), and 0.1% (w/w) xylanase (100,000 XU/g, VALIDASE X, Valley Research, Inc.). Soybean meal, peanut meal, corn gluten meal, sunflower meal, linseed meal, canola meal, and cottonseed meal were treated with aforementioned enzymes following the same procedures described in Example 2. The same procedures described in Example 2 also were followed for 14 hour in situ incubations, and for statistical analyses.

Results and Discussion

Example 1

In vitro ammonia release values and crude protein (CP) remaining after ruminal incubation for 14 h are shown in Table 4. The invertase treated SBM (ESBM) and SOYPLUS treatments did not differ from each other but had 38.9 and 31.8% lower (P<0.05) in vitro ammonia release values than the control SBM, respectively. The ESBM treatment had 15.7 and 185% more (P<0.05) CP remaining after 14 hour ruminal incubation than the SOYPASS and control SBM treatments, respectively. These results suggest that invertase treatment was effective in liberating reducing sugars from the sucrose and galactooligosaccharides present in SBM, and that these sugars were available to participate in non-enzymatic browning reactions.

TABLE 4

In vitro ammonia release and crude protein remaining after ruminal incubation for 14 hours (Exp. 1)

|  | SBM | ESBM | SOYPASS | SEM |
| --- | --- | --- | --- | --- |
| Ammonia release (mM) | 49.67$^a$ | 30.33$^b$ | 33.88$^b$ | 2.132 |
| CP remaining after 14-h (%) | 28.77$^a$ | 82.17$^b$ | 71.04$^c$ | 3.163 |

$^{abc}$Within a row, means without a common superscript letter differ (P < 0.05).
SBM = soybean meal.
ESBM = SBM treated with invertase enzyme.

Example 2

Performance data of broiler chicks fed diets containing SBM, ESBM1, SOYPLUS, or SOYPASS are presented in Table 5. The SOYPASS treatment resulted in a 17, 20.9, and 23.5% lower (P<0.05) feed intake compared to the ESBM1, SOYPLUS and control SBM treatments, respectively. The ESBM1 and SOYPLUS treatments resulted in similar gains but resulted in 37 and 37.5% faster (P<0.05) gains compared to the SOYPASS treatment and 18.8 and 18.5% slower (P<0.05) gains compared to the control SBM treatment, respectively. The ESBM1 treatment resulted in 12% less (P<0.05) efficient gains compared to the control SBM, but 4.5 and 13.7% more (P<0.05) efficient gains compared to the SOYPLUS and SOYPASS treatments, respectively. The observation that the non-enzymatically browned SBM sources resulted in poorer chick performance compared to untreated SBM, suggests that some Amadori compounds or later Maillard reaction products were formed since these products are no longer bioavailable (Mauron, 1981; Hurrell, 1990). Fernandez and Parsons (1996) reported that the digestible lysine bioavailability of SBM treated with dextrose and autoclaved for 30 minutes was markedly reduced to 60%. Batterham et al. (1990) and Van Barneveld et al. (1994) reported similar results in hogs fed cottonseed meal and overheated field peas, respectively.

TABLE 5

Performance of broiler chicks fed different non-enzymatically browned soybean meal sources (Exp. 2, first chick trial)

|  | SBM | ESBM1 | SOYPASS | SOYPLUS | SEM |
| --- | --- | --- | --- | --- | --- |
| Feed Intake (g/d) | 16.49$^a$ | 15.19$^a$ | 12.61$^b$ | 15.94$^a$ | .540 |
| ADG (g/day) | 13.18$^a$ | 10.70$^b$ | 7.81$^c$ | 10.74$^b$ | .404 |
| Gain to Feed | .800$^a$ | .704$^b$ | .619$^c$ | .674$^d$ | .0072 |

$^{abcd}$Within a row, means without a common superscript letter differ (P < 0.05).
SBM = soybean meal.
ESBM1 = SBM was treated with invertase enzyme and heated in ovens set at 105° C. until the core temperature reached 100° C.

Performance of broiler chicks during the second growth trial is shown in Table 6. The ESBM1, ESBM2 and SOYPLUS treatments resulted in similar feed intakes but resulted in 12.6, 8.2 and 12.2% higher (P<0.05) intakes compared to the SOYPASS treatment and 8, 11.7, and 8.3% lower (P<0.05) intakes compared to the control SBM treatment, respectively. The ESBM2, ESBM1, SOYPLUS and control SBM treatment resulted in 25.2, 33.9, 34.9, and 68.5% faster (P<0.05) and 16, 18.9, 20.1, and 36.5% more efficient (P<0.05) gains compared to the SOYPASS treatment, respectively. These data suggest that lysine availability of ESBM1 was similar to that of SOYPLUS treatment, whereas the ESBM2 treatment had lower lysine availability compared to the SOYPLUS treatment. The ESBM1 and ESBM2 treatments resulted in higher availability compared to the SOYPASS treatment.

TABLE 6

Performance of broiler chicks fed different non-enzymatically browned soybean meal sources (Exp. 2, second chick trial)

|  | SBM | ESBM1 | ESBM2 | SOYPASS | SOYPLUS | SEM |
| --- | --- | --- | --- | --- | --- | --- |
| Feed Intake (g/d) | 37.50$^a$ | 34.50$^b$ | 33.13$^b$ | 30.63$^c$ | 34.38$^b$ | .587 |
| ADG (g/day) | 24.83$^a$ | 19.74$^b$ | 18.45$^c$ | 14.74$^d$ | 19.88$^b$ | .378 |
| Gain to Feed | .658$^a$ | .573$^{bc}$ | .559$^c$ | .482$^d$ | .579$^b$ | .0051 |

$^{abcd}$Within a row, means without a common superscript letter differ (P < 0.05).
SBM = soybean meal.
ESBM1 = SBM was treated with invertase enzyme and heated in ovens set at 105° C. until the core temperature reached 100° C.
ESBM2 = Same as ESBM1 except that product was removed from ovens 30 min later.

Amounts of CP remaining after ruminal incubation of the different treated SBM sources for 10 and 14 hours are shown in Table 7. The ESBM1 treatment had 7.8 and 10.1% less (P<0.05) CP remaining after 10 hours and 29 and 29.9% less (P<0.05) after 14 hour ruminal incubation than SOYPASS and ESBM2 treatments, respectively. However, the ESBM1 treatment had 7.2 and 61.9% more (P<0.05) CP remaining after 10 hours ruminal incubation than SOYPLUS and control SBM treatments, respectively. ESBM1 treatment had similar amounts of CP remaining after 14 hours ruminal incubation than SOYPLUS but had 160.1% more (P<0.05) CP than the control SBM treatment. ESBM2 treatment had similar amounts of CP remaining after 10 and 14 hour ruminal incubation than SOYPASS but had 11.2, 19.2, and 80% more (P<0.05) CP after 10 hours and 42.7, 36.6, and 271% more (P<0.05) after 14 hours compared to the ESBM1, SOYPLUS and control SBM treatment, respectively.

TABLE 7

Crude protein remaining after ruminal incubation for 10 and 14 hours (Exp. 2)

|  | SBM | ESBM1 | ESBM2 | SOYPASS | SOYPLUS | SEM |
|---|---|---|---|---|---|---|
| 10 hour | 45.28$^a$ | 73.31$^d$ | 81.52$^d$ | 81.12$^d$ | 68.41$^c$ | 1.257 |
| 14 hour | 19.28$^a$ | 50.14$^b$ | 71.53$^c$ | 70.68$^c$ | 52.38$^b$ | 3.261 |

$^{abcd}$Within a row, means without a common superscript letter differ (P < 0.05).
SBM = soybean meal.
ESBM1 = SBM was treated with invertase enzyme and heated in ovens set at 105° C. until the core temperature reached 100° C.
ESBM2 = Same as ESBM1 except that product was removed from ovens 30 min later.

It can be concluded from preceding results that the treatment of SBM with invertase enzyme before heating is an effective means of protecting the SBM protein against degradation by ruminal microbes while still maintaining high lysine bioavailability.

Example 3

There was no significant interaction between invertase level and α-galactosidase:invertase ratio; therefore only main effects will be discussed. Increasing the α-galactosidase:invertase ratio only tended (P=0.10) to increase the amount of SBM, DM and CP remaining in dacron bags after ruminal incubation for 14 hours. However, increasing invertase level increased linearly (P<0.01) the amount of SBM, DM and CP remaining in dacron bags after ruminal incubation for 14 hours (Table 8). Theoretically, invertase and α-galactosidase should have synergistic effects since invertase hydrolyzes raffinose and stachyose to melibiose and manninotriose (Slominski, 1994). Activity of α-galactosidase is greater on melibiose and manninotriose (Quemener and Brillouet, 1983) than on raffinose and stachyose. Slominski (1994) reported that α-galactosidase in concert with invertase yielded greater hydrolysis of galactooligosaccharides found in SBM and canola meal than α-galactosidase acting alone. Unfortunately, they did not include a treatment with invertase alone. It is unknown why the combination of invertase and α-galactosidase did not have a significant synergistic effect in this study. However, the possibility that the enzyme preparations used in this study contained significant side activities can not be ruled out.

TABLE 8

Invertase level main effect on soybean meal dry matter (DM) and crude protein (CP) remaining in dacron bags after ruminal incubation for 14 hours (Exp. 3)$^1$

| Invertase$^2$ level % (w/w) | DM$^3$ | CP$^3$ |
|---|---|---|
|  | % |  |
| 0.0000 | 34.6 | 50.2 |
| 0.0125 | 47.7 | 68.0 |
| 0.0250 | 48.7 | 69.4 |
| 0.0500 | 53.8 | 75.6 |
| 0.1000 | 53.3 | 74.8 |
| SEM | .84 | 1.09 |

$^1$Samples were steeped for 60 min at 55° C. and then cooked for 60 min at 150° C.
$^2$80,000 SU/g.
$^3$Linear effect of invertase level (P < 0.0001).

Example 4

A comparison of DM and CP remaining in dacron bags after ruminal incubation for 14 hours of various commercial non-enzymatically browned SBM products and SBM treated with different reducing sugars, enzymes or yeast products are presented in Table 9. Treatment of SBM with yeast, invertase, or a combination of invertase and α-galactosidase enzymes resulted in similar amounts of CP remaining after 14 hour ruminal incubation compared to SOYPASS but higher (P<0.05) amounts compared to SOYPLUS. Extruded soy and SOYPLUS had similar amounts of CP remaining after ruminal incubation compared to SBM to which 10% water was added. Treatment of SBM with FLEISCHMANN'S yeast, invertase, or a combination of invertase and α-galactosidase enzymes resulted in similar amounts of CP remaining after ruminal incubation compared to treatment with a combination of 1% glucose and 1% fructose or 2% xylose but higher (P<0.05) amounts compared to 2% glucose or fructose. SOYPASS had similar amounts of CP remaining after ruminal incubation compared to all reducing sugar treatments. The 2% xylose treatment did not differ from the combination of 1% glucose and 1% fructose treatment but more (P<0.05) CP remained after ruminal incubation compared to the 2% glucose or fructose treatments. This observation is supported by results of Cleale et al. (1987a), who found that xylose was more reactive than glucose, fructose and lactose. The combination of 1% glucose and 1% fructose treatment resulted in more (P<0.05) CP remaining after ruminal incubation compared to either 2% glucose or 2% fructose, suggesting that a positive associative effect might occur. Glucose treatment did not differ from fructose treatment. Cleale et al. (1987a) reported that fructose reacted similarly to glucose after heating for 30 minutes, but after 60 minutes of heating ammonia release was suppressed to a greater extent with glucose than fructose. Reyes et al. (1982) found that fructose reacted similarly to glucose over short reaction times, but to a lesser degree over extended reaction periods.

TABLE 9

Dry matter (DM) and crude protein (CP) remaining in dacron bags after ruminal incubation for 14 hours of various commercial non-enzymatically browned SBM products and SBM treated with different reducing sugars, enzymes, or yeast products (Exp. 4)

| Treatments | DM | CP |
|---|---|---|
|  | % |  |
| Untreated control | 22.6$^a$ | 31.3$^a$ |
| 10% Water$^1$ | 34.6$^b$ | 50.2$^b$ |

TABLE 9-continued

Dry matter (DM) and crude protein (CP) remaining in dacron bags after ruminal incubation for 14 hours of various commercial non-enzymatically browned SBM products and SBM treated with different reducing sugars, enzymes, or yeast products (Exp. 4)

| Treatments | DM | CP |
|---|---|---|
| | % | |
| Extruded soy | 35.9[b] | 48.9[b] |
| SOYPLUS | 44.0[c] | 55.8[b] |
| SOYPASS | 50.2[def] | 72.2[cde] |
| 0.5% WESTERN Yeast[1] | 48.9[cde] | 69.5[cd] |
| 0.5% FLEISCHMANN'S yeast[1] | 54.3[ef] | 75.8[de] |
| 0.05% Invertase[1,2] | 52.1[ef] | 73.4[de] |
| 0.05% Invertase[2] + 0.05% α-galactosidase[1,3] | 55.4[f] | 77.6[e] |
| 2% Glucose[1] | 45.9[cd] | 65.7[c] |
| 2% Fructose[1] | 46.3[cd] | 66.1[c] |
| 1% Glucose + 1% Fructose[1] | 53.1[ef] | 75.0[de] |
| 2% Xylose[1] | 55.2[f] | 77.0[e] |
| SEM | 1.93 | 2.58 |

[abcdef]Within a column, means without a common superscript letter differ (P < 0.05).
[1]Treatments were applied on a weight/weight basis.
[2]80,000 SU/g.
[3]25,000 AGSU/g.

The results of this trial suggest that the treatment of SBM with yeast, invertase, or a combination of invertase and α-galactosidase enzymes compare favorably with commercial non-enzymatically browned SBM products and SBM treated with different reducing sugars.

Example 5

Effects of steeping temperature of SBM treated with yeast on DM and CP remaining in dacron bags after ruminal incubation for 14 hours are shown in Tables 10 and 11, respectively. Steeping at 23° C. resulted in less (P<0.05) SBM, DM and CP remaining after 14 hour ruminal incubation than steeping at 30° C. Steeping SBM treated with WESTERN yeast at 30° C. resulted in a numerical increase of 8.3% in CP remaining, compared to steeping at 55° C. Steeping SBM treated with FLEISCHMANN'S yeast at 30° C. increased (P<0.05) CP remaining after ruminal incubation by 7.4% compared to steeping at 55° C. suggesting that the higher temperature may kill the yeast prematurely. These data suggest 30° C. as an optimal steeping temperature for SBM treated with yeast.

TABLE 10

Effects of steeping temperature on soybean meal dry matter remaining in dacron bags after ruminal incubation for 14 hours (Exp. 5)

| Steeping Temperature ° C. | 0.5% WESTERN yeast[1] | 0.5% FLEISCHMANN'S yeast[1] | Control SBM[2] |
|---|---|---|---|
| | | % | |
| 23 | 36.0[a] | 44.7[a] | — |
| 30 | 48.9[b] | 54.3[b] | — |
| 55 | 44.7[b] | 50.0[c] | 34.6 |
| SEM | 2.17 | 1.34 | — |

[abc]Within a column, means without a common superscript letter differ (P < 0.05).
[1]Samples were steeped for 60 min at 23, 30 or 55° C. and then cooked for 60 min at 150° C.
[2]Water (10% w/w) was added to the same soybean meal, steeped at 55° C. and then cooked for 60 min at 150° C. to serve as a reference point only.

TABLE 11

Effects of steeping temperature on soybean meal crude protein remaining in dacron bags after ruminal incubation for 14 hours (Exp. 5)

| Steeping Temperature ° C. | 0.5% WESTERN yeast[1] | 0.5% FLEISCHMANN'S yeast[1] | Control SBM[2] |
|---|---|---|---|
| | | % | |
| 23° C. | 52.0[a] | 64.6[a] | — |
| 30° C. | 69.5[b] | 75.8[b] | — |
| 55° C. | 64.2[b] | 70.6[c] | 50.2 |
| SEM | 2.76 | 1.59 | — |

[abc]Within a column, means without a common superscript letter differ (P < 0.05).
[1]Samples were steeped for 60 min at 23, 30 or 55° C. and then cooked for 60 min at 150° C.
[2]Water (10% w/w) was added to the same soybean meal, steeped at 55° C. and then cooked for 60 min at 150° C. to serve as a reference point only.

Example 6

Dry matter and CP remaining in dacron bags after ruminal incubation for 14 hours of various protein-rich feedstuffs treated with different enzyme combinations are shown in Tables 12 and 13, respectively. Compared to 10% water addition, the combination of 0.1% (w/w) α-galactosidase and 0.1% (w/w) invertase, increased (P<0.05) CP remaining after ruminal incubation for all protein sources except peanut meal, corn gluten meal, and cottonseed meal. Crude protein remaining after ruminal incubation was similar for the combination of 0.1% (w/w) α-amylase and 0.1% (w/w) glucoamylase treatment and the 10% water treatment among all protein sources, with the exception of SBM and corn gluten meal, where it was higher (P<0.05) for the enzyme treatment. This result was not unexpected since SBM contains around 1% starch (Huisman et al., 1998) and corn gluten meal contains residual starch as a consequence of incomplete starch extraction. Crude protein remaining after ruminal incubation was similar for the combination of 0.1% (w/w) hemicellulase, 0.1% (w/w) cellulase, and 0.1% (w/w) xylanase treatment and the 10% water treatment among all protein sources, with SBM and corn gluten meal again being the exceptions. Huisman et al. (1999) reported very little degradation after incubating SBM polysaccharides with a combination of endo-galactonase, endo-arabinase, rhamnogalacturonan hydrolase, and rhamnogalacturonan acetyl esterase. They suggested that the network of the cell wall polysaccharides present in SBM appears to be too complex or too dense to be penetrated by the applied enzymes.

TABLE 12

Dry matter remaining in dacron bags after ruminal incubatic (14-h) of various protein source treated with different enzymes (Exp. 6)

| Treatment* | Protein Source | | | | | | |
|---|---|---|---|---|---|---|---|
| | Soybean meal | Peanut Meal | Corn Gluten Meal | Sunflower Meal % | Linseed meal | Canola meal | Cottonseed meal |
| Untreated control | 22.6$^a$ | 8.1$^a$ | 63.4$^a$ | 39.5$^a$ | 38.9$^{ab}$ | 27.4$^a$ | 48.9$^a$ |
| 10% Water | 34.6$^b$ | 16.1$^{bc}$ | 74.7$^b$ | 56.3$^b$ | 39.4$^{ab}$ | 41.1$^b$ | 55.9$^{bc}$ |
| 0.1% Inv$^1$ + 0.1% α-GS$^2$ | 53.6$^d$ | 22.1$^c$ | 75.3$^b$ | 53.8$^b$ | 45.0$^c$ | 51.3$^c$ | 58.9$^c$ |
| 0.1% αa-A$^3$ + 0.1% GA$^4$ | 44.4$^c$ | 21.4$^c$ | 76.5$^b$ | 48.9$^b$ | 41.3$^{bc}$ | 41.7$^b$ | 55.1$^b$ |
| 0.1% HCell$^5$ + 0.1% Cell$^6$ + 0.1% Xyl$^7$ | 41.4$^{bc}$ | 13.9$^{ab}$ | 75.7$^b$ | 51.0$^b$ | 35.9$^a$ | 42.9$^b$ | 54.3$^b$ |
| SEM | 2.37 | 2.41 | 0.69 | 2.61 | 1.37 | 0.93 | 1.22 |

$^{abc}$Within a column, means without a common superscript letter differ ($P < 0.05$).
*Treatments were applied on a weight/weight basis.
$^1$Inv = Invertase (80,000 SU/g).
$^2$α-GS = α-Galactosidase (25,000 AGSU/g).
$^3$α-A = α-Amylase (40,000 SKBU/g).
$^4$GA = Gluco-amylase (300-330 AG/ml).
$^5$HCell = Hemicellulase (400,000 HUC/g).
$^6$Cell = Cellulase (4,000 CU/g).
$^7$Xyl = Xylanase (100,000 XU/g).

TABLE 13

Crude protein remaining in dacron bags after ruminal incubatic (4-h) of various protein sources treated with different enzymes (Exp. 6)

| Treatment* | Protein Source | | | | | | |
|---|---|---|---|---|---|---|---|
| | Soybean meal | Peanut Meal | Corn Gluten Meal | Sunflower Meal % | Linseed meal | Canola meal | Cottonseed meal |
| Untreated control | 31.3$^a$ | 7.1$^a$ | 82.0$^a$ | 24.0$^a$ | 42.1$^{ab}$ | 22.5$^a$ | 53.4$^a$ |
| 10% Water | 50.2$^b$ | 23.0$^{bc}$ | 92.7$^b$ | 48.9$^b$ | 44.9$^{ab}$ | 47.9$^b$ | 66.7$^{bc}$ |
| 0.1% Inv$^1$ + 0.1% α-GS$^2$ | 75.2$^d$ | 33.1$^c$ | 93.3$^b$ | 61.7$^c$ | 57.7$^c$ | 64.9$^c$ | 69.8$^c$ |
| 0.1% α-A$^3$ + 0.1% GA$^4$ | 62.9$^c$ | 31.6$^c$ | 95.2$^c$ | 50.1$^b$ | 48.5$^b$ | 49.4$^b$ | 65.5$^{bc}$ |
| 0.1% HCell$^5$ + 0.1% Cell$^6$ + 0.1% Xyl$^7$ | 60.5$^c$ | 19.0$^{ab}$ | 94.6$^c$ | 52.7$^b$ | 39.1$^a$ | 44.0$^b$ | 62.7$^b$ |
| SEM | 3.18 | 4.01 | 0.26 | 1.55 | 2.55 | 3.56 | 2.01 |

$^{abc}$Within a column, means without a common superscript letter differ ($P < 0.05$).
*Treatments were applied on a weight/weight basis.
$^1$Inv = Invertase (80,000 SU/g).
$^2$α-GS = α-Galactosidase (25,000 AGSU/g).
$^3$α-A = α-Amylase (40,000 SKBU/g).
$^4$GA = Gluco-amylase (300-33- AG/ml).
$^5$HCell = Hemicellulase (400,000 HUC/g).
$^6$Cell = Cellulase (4,000 CU/g).
$^7$Xyl = Xylanase (100,000 XU/g).

It can be concluded from preceding results that the treatment of protein-rich feedstuffs with various enzymes before heating is an effective means of producing reducing sugars that can participate in non-enzymatic browning reactions, thus protecting proteins against degradation by ruminal microbes.

From the above description, it can be understood that the method of making and using the feed of this invention has several advantages, such as, for example:

relatively high protein bioavailability is maintained in the post-rumen tract;

no substantial dilution of protein content occurs;

the protein content of the feed is substantially protected from ruminal degradation; and the method of making and using are economical to carry out.

Although particular embodiments have been described, many other modes of carrying out the invention are contemplated and are possible from and with the above teachings. Accordingly, it is to be understood that, within the scope of the following claims, the invention may be practiced other than as specifically described.

We claim:

1. A method of making a ruminant animal feed comprising the steps of:

mixing a yeast together with a protein and a carbohydrate to form a feed mixture, the yeast effective in hydrolyzing the carbohydrate to reducing forms;

steeping the feed mixture at a temperature, pH and percent moisture for a time sufficient for the yeast to hydrolyze carbohydrate contained within the feed mixture to reducing forms; and heating the feed mixture at a temperature for a time sufficient to significantly reduce ruminal protein degradability and also to provide that no significant reduction in protein bioavailability occurs in the post-rumen tract.

2. A method according to claim 1 in which the protein is selected from a group consisting of soybean meal, canola meal, sunflower meal, peanut meal, cottonseed meal, linseed meal and mixtures thereof.

3. A method according to claim 1 in which the protein is soybean meal.

4. A method according to claim 1 in which the carbohydrate and the protein are supplied from a single source during mixing.

5. A method according to claim 1 in which carbohydrate from an external source is added to the protein and yeast during mixing.

6. A method according to claim 1 in which the yeast is Baker's yeast (*Saccharomyces cerevisiae*).

7. A method according to claim 6 in which the concentration of the Baker's yeast mixed with the protein and carbohydrate is about 200,000 colony forming units to about 100 billion colony forming units per 100 grams of protein and carbohydrate, where soybean meal represents the protein and carbohydrate.

8. A method according to claim 1 in which the temperature for steeping is from about 20° C. up to about 75° C.

9. A method according to claim 1 in which the pH range for steeping is from about 4.0 up to about 10.5.

10. A method according to claim 1 in which the pH range for steeping is from about 5.0 up to about 7.0.

11. A method according to claim 1 in which the time for steeping is from about 10 minutes up to about 12 hours.

12. A method according to claim 1 in which the time for steeping is from about 40 to about 90 minutes.

13. A method according to claim 1 in which the temperature for heating is about 80° C. up to about 180° C.

14. A method according to claim 1 in which the temperature for heating is about 90° C. to about 120° C.

15. A method according to claim 1 in which the time for heating is from about 30 minutes up to about 3 hours.

16. A method according to claim 1 in which the percent moisture for steeping is up to about 40% by weight of the feed mixture.

17. A method according to claim 1 in which the percent moisture for steeping is from about 10% up to about 20% by weight of the feed mixture.

18. A method of feeding ruminant animals comprising the steps of:
   selecting a feed suitable for a ruminant animal; and
   feeding to the ruminant animal a feed mixture formed by mixing the feed and a yeast, the yeast effective in hydrolyzing carbohydrates contained within the feed to reducing forms so that, after steeping and browning, the feed mixture has reduced protein degradability in the rumen.

19. A method of hydrolyzing carbohydrates to reducing forms for subsequent use in preparing ruminant animal feed, comprising the steps of:
   mixing a yeast together with a carbohydrate, the yeast effective in hydrolyzing the carbohydrate to reducing forms; and
   steeping the mixture at a temperature, pH and percent moisture for a time sufficient for the yeast to hydrolyze carbohydrate to reducing forms.

20. A method according to claim 19 in which the carbohydrate is selected from a group consisting of soybean meal, canola meal, sunflower meal, peanut meal, cottonseed meal, linseed meal and mixtures thereof.

21. A method according to claim 19 in which the carbohydrate is soybean meal.

22. A method according to claim 19 in which the yeast is Baker's yeast (*Saccharomyces cerevisiae*).

23. A method according to claim 22 in which the concentration of Baker's yeast mixed with the carbohydrate is about 200,000 colony forming units up to about 100 billion colony forming units per 100 grams of carbohydrate where soybean meal represents the carbohydrate.

24. A method according to claim 19 in which the temperature for steeping is from about 20° C. up to about 75° C.

25. A method according to claim 19 in which the temperature for steeping is from about 23° C. up to about 55° C.

26. A method according to claim 19 in which the pH range for steeping is from about 4.0 up to about 10.5.

27. A method according to claim 19 in which the pH range for steeping is from about 5.0 up to about 7.0.

28. A method according to claim 19 in which the time for steeping is from about 10 minutes up to about 12 hours.

29. A method according to claim 19 in which the time for steeping is from about 40 minutes up to about 90 minutes.

* * * * *